United States Patent Office 2,907,972
Patented Oct. 6, 1959

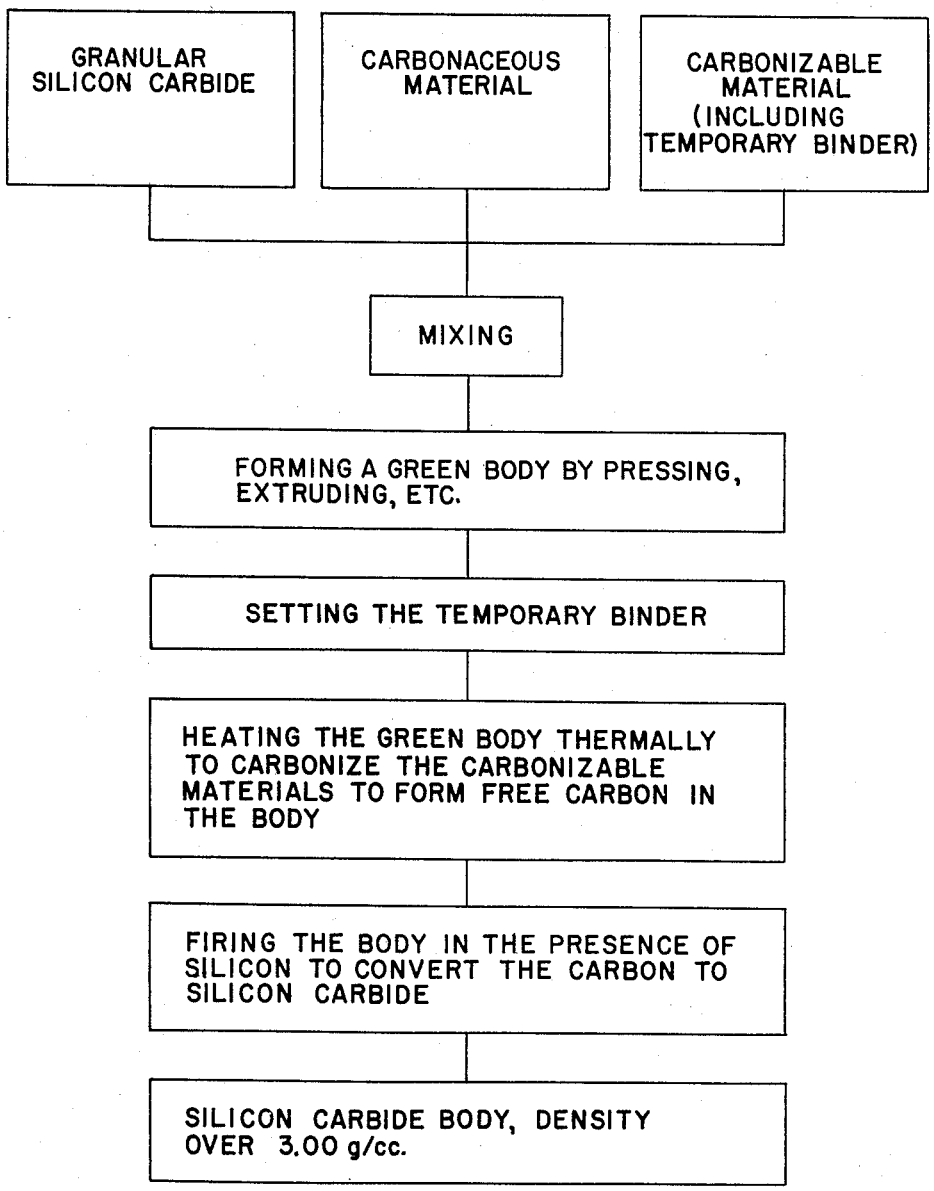

2,907,972

PROCESS FOR PRODUCING SILICON CARBIDE BODIES

Walter E. Schildhauer, Sanborn, and Matthew Skuza, Niagara Falls, N.Y., assignors to The Carborundum Company, Niagara Falls, N.Y., a corporation of Delaware Application August 12, 1957, Serial No. 677,741

10 Claims. (Cl. 338—332)

This invention relates to the manufacture of silicon carbide bodies that are characterized by high density and readily controllable electrical properties.

Silicon carbide is an excellent material for many specialized purposes such as, for example, electrical resistors and high temperature crucibles, because it is capable of withstanding very high temperatures. It has long been recognized, however, that the silicon carbide bodies that are made by ordinary techniques are relatively porous. The porosity of ordinary silicon carbide bodies is a disadvantage because silicon carbide tends to oxidize at high temperatures, and the porosity of ordinary silicon carbide bodies permits air to circulate and thus permits oxidation to occur throughout the entire body. This characteristic has limited the application of silicon carbide bodies, as electrical resistance heaters, to those applications that were below the temperature of rapid oxidation.

To make silicon carbide bodies that are less porous and more dense, and hence less susceptible to oxidative destruction, many techniques have been developed.

For example, dense refractory silicon carbide bodies that are substantially free of materials other than silicon carbide have been obtained by forming a recrystallized, porous silicon carbide body structure, impregnating the pores of the body with a carbonizable material such as furfural, carbonizing this material with mineral acid to form pores that are loaded with deposited carbon, and then firing the carbon-impregnated body in the presence of silicon to cause the silicon to penetrate the pores and react with the carbon to form additional silicon carbide. It will be noted that this process requires two firing steps: one firing step is required to form the recrystallized silicon carbide body structure; and a second firing step is necessary to form the additional silicon carbide in the pores of the original body. A dense body is obtained which may be somewhat porous, and the steps of impregnating the body with carbon, and firing in the presence of silicon to form additional silicon carbide, can be repeated as often as desired further to increase the density of the body.

The process described above, that requires two firing steps, usually takes one week or more. In addition, the process is quite costly to perform.

A popular type of heating element, that uses silicon carbide, is the cold ended rod. This rod comprises a central section that is made from silicon carbide and that has relatively high electric resistance characteristics, and two ends that have relatively higher electrical conductivity. In such a rod, the central heating section may be a silicon carbide body, and the ends may be siliconized silicon carbide bodies. In making rods of this type, the cold ends and the central heating section are formed separately, and then are glued together, usually with mucilage, after which the parts are welded together.

Except by the use of certain additives, it is practically impossible to regulate the electrical resistance of the heating section of a cold end rod. There is therefore a need for a dense silicon carbide body whose electrical characteristics can be readily controlled. Moreover, the use of mucilage as a temporary cement for cold end rods has some disadvantages, and there is a need for a superior bonding agent for this purpose, which will have high early strength, good fired strength, and after firing, good refractory properties, minimum porosity, good electrical conductivity, and a coefficient of expansion similar to that of the united parts of the rod.

One object of the present invention is to provide a practical cement that can be siliconized to produce a silicon carbide body of high density that is composed primarily of silicon carbide, with controlled minor amounts of other materials.

Another object of the invention is to provide a new cement for use as a temporary binder in the manufacture of cold end heating rods, to join the cold ends to the heating sections. A related object of the invention is to provide a cement of the character described that can be fired to produce a dense silicon carbide bond having controlled electrical conductivity.

A further object of the invention is to provide a method for making a high density silicon carbide bond to unite the parts of silicon carbide heating rods, and whose electrical resistance can be carefully controlled and consistently maintained. A related object of the invention is to provide a process for the production of dense silicon carbide bodies of controlled electrical resistance characteristics that can be employed as heating elements.

Another related object of the invention is to provide a process for making silicon carbide bodies of such high density and having such refractory and strength characteristics, and such good resistance to thermal shock, that the bodies may be used, for example, as thermocouple protection tubes and the like, that are capable of withstanding violent changes in ambient temperature.

Still another object of the invention is to provide a process for making silicon carbide bodies which process will be economical and adapted to mass production techniques.

Another object of the invention is to provide a method for making silicon carbide bodies in which only a single firing step is required.

Other objects of the invention will become apparent to those skilled in the art from the following detailed description of the invention.

We have found that silicon carbide in a dense carbon body acts as a trigger or catalyst to start a reaction between the silicon carbide and molten silicon, which in turn causes a reaction between silicon and carbon, to form more silicon carbide. This phenomenon makes possible the siliconizing of fine, dense carbon bodies and is particularly of interest because previous research workers indicated that it was not possible to siliconize fine dense carbon bodies.

In its broad aspects, then, the invention involves the incorporation of silicon carbide granules in a fine, dense carbon body, and the subsequent firing and siliconizing of the body in contact with silicon to produce a body comprising essentially silicon carbide and a minor amount of silicon. This body has desirable characteristics of porosity, density, refractoriness, and electrical conductivity. The unfired mix can be used as a cement. The body makes an excellent electrical conductor and has good refractory properties and excellent resistance to thermal shock.

Proportions of the ingredients in the mix are subject to adjustment. If the carbon component of the body is fine and non-porous, that is, if it resists penetration by silicon, a large amount of silicon carbide is required to promote siliconization. Pitch coke and graphite have limited porosity. Hence a mix that contains a large amount of pitch coke or graphite will require a large amount of silicon carbide to promote siliconization. The converse is true of charcoal, which has an open structure that permits penetration by molten silicon. Thus the type of carbon in the mix affects the amount of silicon carbide that is required to promote siliconization.

Preferably the carbonizable material is a thermosetting synthetic resin, at least in part, which resin functions as a temporary binder.

Resins such as the condensation products of aldehydes and phenols, and particularly the resorcinol-formaldehyde resins; and plasticizers such as the cellulose ethers that may be used with these resins as modifiers; have a low ash content and, upon firing in the mix, will carbonize to form a porous structure that will siliconize.

When a carbonaceous material, such as graphite, and a carbonizable resin binder, such as, for example, a resorcinol-formaldehyde condensation product, are employed together to form the carbon body, a basically dense body will be formed that siliconizes with difficulty. Hence the amount of silicon carbide that is required to promote siliconization must be substantial. If charcoal is employed as the carbonaceous ingredient, proportionately less silicon carbide is required.

Accordingly to the present invention, then, dense silicon carbide bodies are obtained by a process in which granular silicon carbide and a resinous carbonizable material, with or without a carbonaceous material, are mixed together, the mixture is shaped as desired, and then the shaped article is fired in the presence of more than the stoichiometric amount of silicon.

This process can be completely performed within a few hours in contrast to the much longer period of time that is required with prior processes that have been proposed or used for the production of silicon carbide bodies. The bodies that are obtained may have a density that is consistently as high as 3.00 gr./cc. or higher. The bodies may consist, for example, of silicon carbide in the alpha or hexagonal crystalline form, bonded by interstitial beta or cubic silicon carbide, together with a small amount of unreacted silicon that is found primarily in the interstitial spaces of the body. When high firing temperatures are used, substantially all of the silicon carbide will be of hexagonal crystalline habit. The silicon content is less than about 8% by weight of the body for siliconized cements and the like, and less for bodies that are carefully prepared for their refractory properties.

The broad steps of the process of this invention are shown in outline form in the drawing that accompanies this description.

As shown in the drawing, the raw materials from which the dense silicon carbide bodies are made include a granular silicon carbide and carbonizable material, and may also include a carbonaceous material. Granular silicon carbide of hexagonal crystalline habit and of any readily available small particle size may be employed.

A carbonizable material, or a carbonizable material and a carbonaceous material, are mixed together with the silicon carbide granules. The expression "carbonaceous material" is employed herein to refer to pitch coke, charcoal or some other type of free carbon. Pitch coke and graphite are the forms of carbon with which the advantages of the invention are most striking. However, charcoal flour and the like also may be employed as the carbonaceous material, with outstanding results.

The expression "carbonizable material" is employed to refer to materials that can be decomposed to form free carbon. The carbonizable material preferably includes a thermosetting synthetic resin as a temporary binder, plasticizing material, and other minor modifying ingredients. Resins of the type that are phenol-formaldehyde condensation products in general, and resorcinol-formaldehyde condensation products in particular, and other similar thermosetting synthetic resins, are preferred for the resinous temporary binder, although other thermosetting resins may be employed. "Methocel" methyl cellulose, or diglycol stearate, or the like, are excellent plasticizers and may be used where the mix is to be extruded rather than pressed. "Methocel" is a trademark of the Dow Chemical Co. that is used to identify a water-soluble methyl cellulose that is supplied as a finely divided white solid material.

The proportions of the several various materials that are employed will be governed by the properties that are desired in the cement and in the fired body. It has been found, for example, that the electrical resistance of the body can be regulated by adjusting the proportion of silicon carbide to carbon in the mixture from which the shape is formed. To decrease the electrical resistance, the amount of carbonaceous material is increased.

Ordinarily the silicon carbide that is employed will be of hexagonal crystalline habit and the granules that are employed will be a mixture of granules of different sizes. Where a dense silicon carbide body is desired the granule sizes will be selected to provide a mixture of silicon carbide granules with a controlled, small amount of void space between the granules. The carbon-containing materials that are added ordinarily will tend to fill up the void spaces between these silicon carbide granules.

The amount of silicon carbide in the mixture should be substantial, at least about 25% by weight, and can be adjusted to correspond to the nature of the carbon in the mixture, which in turn determines the ease with which a shape that is formed from the mixture can be siliconized. The use of granules of silicon carbide in the raw mix has two primary advantages in addition to catalytic effect; it makes the resultant product more refractory, and it also permits regulation of the electrical resistance of the body through control of the proportion of silicon carbide to carbon in the mixture.

In practice, where bodies of different shapes and other characteristics are to be produced on a large scale from the mixture, it is often desirable to conduct the process on a somewhat emperical basis as to the best proportions of ingredients for the particular article. The preparation of a satisfactory mix on the basis of theoretical calculations alone may be difficult. Best results are often obtained, when a standard shape is desired, by preparing a pilot body and thereafter adjusting the proportions of the ingredients as indicated by any characteristics of the pilot body that can be improved.

In making the pilot body, optimum theoretical proportions of the ingredients can be calculated, based upon a quantity of silicon carbide granules between a minimum effective catalytic amount, about 25% by weight of the mixture, and a maximum amount that can be determined by subtraction after calculating the minimum amount of total carbon that must be present after carbonization. The total carbon that must be present after carbonization is that amount required to react with silicon to form a substantially solid body of silicon carbide from a shape that is formed from the mixture.

The minimum amount of silicon carbide that can be employed with any particular combination of carbonizable and carbonaceous ingredients is determined by the susceptibility to siliconization of a shape that is formed from the mixture after the carbonizable ingredients have been carbonized during the early part of the firing process. This minimum amount is dependent upon susceptibility of the shape to siliconization and is about 25% by weight for a mixture that contains sufficient thermosetting resin to impart good adhesiveness and cohesiveness to the mixture.

In the preferred method for the practice of the invention, the silicon carbide grains are thoroughly mixed by tumbling. The graphite or other carbonaceous material is then added and tumbling is continued. After the carbonaceous material and the granular silicon carbide are thoroughly mixed, the carbonizable materials, including the resinous temporary binder, are blended into the mixture.

This cementitious mixture may be applied between two parts that are to be united; or alternatively, if it is employed to form bodies, it is pressed at high pressures, extruded, or otherwise suitably molded to the desired shape; and then may be oven-dried to remove the volatiles of the temporary binder. The shape is then heated to a sufficiently high temperature thermally to carbonize the carbonizable materials, to form free carbon, and heating is then continued to fire the mix in contact with free silicon to siliconize the free carbon. To insure that all of the carbon is converted, a stoichiometric excess of silicon is employed.

The resultant body consists of silicon carbide that is in the hexagonal form, to the extent of the amount of hexagonal silicon carbide that was in the original mix; together with silicon carbide that has been formed by reaction of silicon with the free carbon in the shape; and not over about 8% by weight of the body of free silicon. Considerably less silicon will be present if the initial proportions of the reactants are carefully controlled.

The following specific examples serve further to illustrate the exact manner in which the present invention is practiced.

*Example 1*

A cement was prepared to securing cold ends to the heating sections of cold ended heating rods. The cold ended rods were to be of the usual type, with the cold ends made of siliconized silicon carbide bodies of relatively low electrical resistance, and heating sections made of silicon carbide bodies having relatively high electrical resistance.

The raw mix or cement was made from the following ingredients, in the manner described above:

Resorcinol-formaldehyde resin _____ cc__ 40
Para-formaldehyde _____ gr__ 4
Pitch coke _____ gr__ 30
Fine charcoal _____ gr__ 3
Silicon carbide (60 mesh, or 217 microns, and finer, predominantly finer than 200 mesh or 74 microns) _____ gr__ 50

In the foregoing and following lists of ingredients the square power of the mesh number represents the number of mesh openings per square inch in the screen.

The resin was a liquid condensation product that is sold by the Varcum Chemical Co., Niagara Falls, New York, under their trademark "Varcum 5459R."

This cement was employed to unite cold ends to heating sections. The rods had a maximum diameter of 1¾" and the maximum thickness of the cement between the united parts of the rod was about ½₂". The cement had a strong green strength and was relatively easy to weld as compared to other cements that had been used. It was used within two hours after mixing since the cement lost adhesive power thereafter.

Experience with this cement showed that at a content of silicon carbide lower than about 35% siliconizing was very difficult and the carbon tended to oxidize, so that the joint would fail. With silicon carbide contents above about 35% the joint, after siliconizing, would be as strong or stronger than the heating section of the rod.

In firing the rods, it was also noted that the cemented area was not as easily siliconized as was the heating section of the rod. From this observation it was deduced that by adding even more silicon carbide to the welding cement than the approximately 42% in the above example, a better weld would probably result and this was found to be true. A cement having a higher silicon carbide content was prepared and is described in the following example.

*Example 2*

A cement was made up from the following ingredients:

Resorcinol-formaldehyde resin ("Varcum 5459R," Varcum Chemical Co.) _____ cc__ 345
Para-formaldehyde _____ gr__ 40
Pitch coke _____ gr__ 450
Silicon carbide (60 mesh and finer) (approximately 52% by weight of mixture, dry basis) _____ gr__ 900

This cement had superior welding characteristics but was quite difficult to work. It could be pressed, but was not sufficiently plastic for satisfactory extrusion.

To make a more plastic mixture, the formulation was modified by the addition of 75 gr. of diglycol stearate. "Methocel" methyl cellulose (4000 cps., 2% aqueous solution at 20° C.) can be used as a plasticizer instead of the diglycol stearate. The modified formulation was more plastic and was readily extrudable.

Rods having a diameter of one-half inch were extruded using the above modified mixture, and were then fired in the presence of molten silicon, in graphite crucibles in an induction furnace. Examination then showed that dense bodies had been produced in this manner.

It was noted that when the siliconized rods were removed from the crucibles the rods were quite clean and that there was no bleeding of silicon on cooling such as occurs when free silicon is present. This indicated that the dense bodies had very little free silicon in their structures. This was subsequently confirmed by qualitative tests.

A test heating element was made from one of the siliconized rods, and conventional cold ends were mounted at the ends of the rod. Tests showed that a satisfactory heating element structure could be produced in this way.

The very desirable characteristics of the modified formulation just described indicated that the material would be suitable for a wide variety of applications. Accordingly, the materials was made up into protection tubes for thermocouples. Sample tubes were extruded and fired in the manner described above, in the presence of molten silicon. These tubes did not show any bleeding of silicon at 2700° F. The tubes could be heated to about 2600° F., and then could be immediately dipped in cold water, without fracturing. This demonstrated that the material had superior refractory properties and was resistant to extreme and rapid changes in ambient temperature.

To produce a dense body that will resist oxidative deterioration it is desirable to use a substantial proportion of silicon carbide in the mixture. In general, as the percentage of silicon carbide is increased at the expense of the other ingredients the electrical resistance of the body is increased. The formulation can be modified over a wide range of proportions of ingredients, since the specific kind and proportions of ingredients used to form the body will depend upon the particular electrical resistance and other properties desired in the final bodies, and also upon the method that is used in forming the body, that is, extrusion, pressing, etc.

The electrical resistance of the final bodies can be regulated by adjusting the ratio of silicon carbide to carbon in the initial mixture. In addition, the electrical resistance can be controlled by incorporating small amounts, up to about 3% by weight, of boron oxide in the initial mixture. Typical resistance values for the extrudable formulation described above will fall in the range of from 0.0052 ohm cm. to 0.139 ohm cm. at room temperature.

*Example 3*

An excellent cement for uniting cold ends of siliconized silicon carbide to heating sections of self-bonded silicon carbide was made as follows.

A dry stock mixture was prepared with the following ingredients:

| | |
|---|---|
| Para-formaldehyde _____gr__ | 2,400 |
| Pitch coke_____gr__ | 18,000 |
| Charcoal (100 mesh and finer)_____gr__ | 1,800 |
| Silicon carbide (60 mesh and finer)____gr__ | 30,000 |

This mixture was carefully and thoroughly mixed to homogeneity. Then, when needed, a 1300 gr. portion of the mixture was mixed with 650 cc. of liquid resorcinol-formaldehyde resin ("Varcum 5459R," Varcum Chemical Co.) to form a cement. This cement has excellent adhesive properties. It should be used within about two hours after it is prepared, for optimum adhesion. Joints made with this cement siliconize readily and provide an excellent bond.

Example 4

To demonstrate the invention with a composition having a very high content of silicon carbide, the following mixture was prepared:

| | |
|---|---|
| Silicon carbide (60 mesh and finer)_____gr__ | 100 |
| Para-formaldehyde _____gr__ | 2 |
| "Methocel" methyl cellulose (4000 cps. solution) gr__ | 5 |
| Resorcinol-formaldehyde resin ("Varcum 5459R"; Varcum Chemical Co.)_____cc__ | 25 |

The content of silicon carbide in the above formulation is approximately 80% by weight of the mixture. This mixture was plastic and elastic. It could be wound in a spiral and would hold its shape during firing.

A portion of this mixture was siliconized by firing it in contact with silicon at a temperature that approached but fell short of the vapor temperature of silicon. After the reaction had been observed, the siliconized portion of this mixture was permitted to cool and its properties were observed. It was considerably higher in electrical resistance than bodies formed from either of the two previous examples.

The bodies that were obtained from the foregoing examples were susceptible of careful control and predetermination of their electrical properties. The silicon carbide that was formed by siliconizing the shaped mixture was in the beta or cubic form, or the alpha or hexagonal form, depending on the siliconizing temperature. The beta form has a much lower electrical resistance than alpha or hexagonal form of silicon carbide. Thus, to decrease the electrical resistance, the total carbon content of the mix should be increased and the siliconizing temperature and firing period should be controlled, so that the body obtained will contain a higher amount of beta or cubic silicon carbide.

While the invention has been described in connection with specific embodiments thereof, it will be understood that it is capable of further modification, and this application is intended to cover any variations, uses, or adaptations of the invention following in general the principles of the invention and including such departures from the present disclosure as come within known or customary practice in the art to which the invention pertains and as may be applied to the essential features hereinbefore set forth, and as fall within the scope of the invention or the limits of the appended claims.

We claim:

1. A cementitious composition that is adapted to be siliconized to a refractory form that consists essentially of silicon carbide and less than about 8% by weight of silicon, said composition comprising, by weight, at least about 25% granular silicon carbide in finely divided form, and a carbon-containing mass including a carbonizable thermosetting synthetic resin, said resin being present in sufficient quantity to impart cohesiveness to said composition.

2. A cementitious composition that is adapted to be siliconized to a refractory form that consists essentially of silicon carbide and less than about 8% by weight of silicon, said composition comprising, by weight, at least about 25% granular silicon carbide in finely divided form, and a carbon-containing mass including a thermosetting resorcinol-formaldehyde resin, said resin being present in sufficient quantity to impart cohesiveness and adhesiveness to said composition.

3. A process for making articles of dense silicon carbide, containing less than about 8% free silicon, comprising; forming a substantially homogeneous mixture of at least about 25% by weight of granules of silicon carbide in finely divided form and carbonizable material including a thermosetting synthetic resin, the resin being present in sufficient quantity to function as a binder when set, to hold said mixture in a desired shape; forming a shape from said mixture; and firing said shape in contact with at least sufficient silicon to react with all of the available carbon in said shape and at a temperature to bring about this reaction.

4. A process for making articles of dense silicon carbide, containing less than about 8% free silicon, comprising: forming a substantially homogeneous mixture of at least about 25% by weight of granules of silicon carbide and carbon-containing material including a carbonizable thermosetting synthetic resin, said resin being present in sufficient quantity to function as a binder when set, to hold said mixture in a desired shape, and the total amount of carbon in said carbon-containing material being at least sufficient to react with silicon to form a substantially solid body of silicon carbide from a shape that is formed from said mixture; forming a shape from said mixture; and firing said shape in contact with at least sufficient silicon to react with all of the available carbon in said shape and at a temperature to bring about this reaction.

5. A process for making articles of dense silicon carbide, containing less than about 8% free silicon, comprising: forming a substantially homogeneous mixture of at least about 25% by weight of granules of silicon carbide in finely divided state, carbonaceous material, and carbonizable material including a thermosetting synthetic resin, said resin being present in sufficient quantity to function as a binder when set, to hold said mixture in a desired shape, the total amount of carbon in said carbonaceous material and in said carbonizable material being at least sufficient to react with silicon to form a substantially solid body of silicon carbide from a shape that is formed from said mixture; forming a shape from said mixture; and firing said shape in contact with at least sufficient silicon to react with all of the available carbon in said shape and at a temperature to bring about this reaction.

6. A method of siliconizing fine dense masses of carbon to form bodies of silicon carbide that contain less than about 8% free silicon, comprising: forming a substantially homogenous mixture of at least about 25% by weight of granules of silicon carbide in finely divided state, carbonaceous material that tends to resist siliconization, and carbonizable material including a thermosetting condensation product of formaldehyde and a phenol, said condensation product being present in sufficient quantity, when set, to hold said mixture in a desired shape, the total amount of carbon in said carbonaceous material and in said carbonizable material being at least sufficient to react with silicon to form a substantially solid body of silicon carbide from a shape that is formed from said mixture; forming a shape from said mixture; and firing said shape in contact with at least sufficient silicon to react with all of the available carbon in said shape and at a temperature to bring about the reaction.

7. A method of siliconizing fine dense masses of carbon to form bodies of silicon carbide that contain less than about 8% free silicon, comprising: forming a substantially homogeneous mixture of at least about 25% by weight of granules of silicon carbide in finely divided state, carbonaceous material that tends to be difficult to siliconize, and carbonizable material including a liquid condensation product of formaldehyde with a phenol, said condensation product being present in sufficient quantity, when set, to hold said mixture in a desired shape, the total amount of carbon in said carbonaceous material and in said carbonizable material being at least sufficient to react with silicon to form a substantially solid body of silicon carbide from a shape that is formed from said mixture; forming a shape from said mixture; and firing said shape to carbonize the carbonizable material to form free carbon, and thereafter continuing said firing in contact with at least sufficient silicon to react with all of the available carbon in said shape and at a temperature to bring about this reaction.

8. In a cold end heating rod having a silicon carbide heating section and a cold end of a siliconized silicon carbide, a joint uniting the heating section to the end and having a thickness up to about $\frac{1}{32}''$, said joint consisting essentially of silicon carbide and not more about 8% by weight of the joint of elemental silicon, said silicon carbide in said joint being in the form of crystals that are interlocked and at least partially interdiffused with each other and with the cubic silicon carbide crystals in said heating section and in said cold end.

9. In a cold end heating rod having a silicon carbide heating section and a cold end of siliconized silicon carbide, a joint uniting the heating section to the end and having a thickess up to about $\frac{1}{32}''$, said joint consisting essentially of cubic silicon carbide, granular silicon carbide of hexagonal crystal habit, and not more than about 8% by weight of the joint of elemental silicon, the cubic silicon carbide crystals being interlocked and at least partially interdiffused with each other and with cubic silicon carbide crystals in said heating section and in said cold end.

10. In a cold end heating rod having a silicon carbide heating section and a cold end of siliconized silicon carbide, a joint uniting the heating section to the end and having a thickness up to about $\frac{1}{32}''$, said joint consisting essentially of crystalline silicon carbide, not more than about 8% by weight of the joint of elemental silicon, and up to about 3% by weight of the joint of boron oxide to control the electrical conductivity of said joint, said crystals of silicon carbide being interlocked and at least partially interdiffused with each other and with the silicon carbide crystals in said heating section and in said cold end.

References Cited in the file of this patent

UNITED STATES PATENTS

| | | |
|---|---|---|
| 1,868,631 | Doidge | July 26, 1932 |
| 2,445,296 | Wejnard | July 13, 1948 |
| 2,470,352 | Holmes | May 17, 1949 |
| 2,472,801 | Barfield et al. | June 14, 1949 |

FOREIGN PATENTS

| | | |
|---|---|---|
| 365,081 | Great Britain | Jan. 15, 1932 |
| 488,927 | Canada | Dec. 16, 1932 |